United States Patent [19]
Aoki

[11] 4,088,914
[45] May 9, 1978

[54] ELECTRIC MOTOR

[75] Inventor: Kanemasa Aoki, Yokohama, Japan

[73] Assignees: Canon Kabushiki Kaisha; Canon Seiki Kabushiki Kaisha, both of Tokyo, Japan

[21] Appl. No.: 632,969

[22] Filed: Nov. 18, 1975

Related U.S. Application Data

[63] Continuation of Ser. No. 489,085, Jul. 17, 1974, abandoned.

[30] Foreign Application Priority Data

Jul. 20, 1973 Japan ................................ 48-81468

[51] Int. Cl.² ............................................. H02K 1/22
[52] U.S. Cl. ..................................... 310/264; 310/46; 310/89; 310/90; 310/237
[58] Field of Search .................. 310/154, 46, 152, 42, 310/155, 89, 90, 221, 230, 237, 162–164, 261, 216, 217, 263–265, 218, 91

[56] References Cited

U.S. PATENT DOCUMENTS

| | | | |
|---|---|---|---|
| 2,701,318 | 2/1955 | Feiertag | 310/89 |
| 2,818,518 | 12/1957 | Phaneuf | 310/237 |
| 3,420,335 | 1/1969 | Dochterman | 310/90 |
| 3,463,949 | 8/1969 | Stone | 310/89 |
| 3,568,309 | 3/1971 | Preece | 310/237 |
| 3,622,822 | 11/1971 | Cofstrand | 310/89 |
| 3,745,391 | 7/1973 | Dochterman | 310/90 |
| 3,808,491 | 4/1974 | Riggs | 310/164 |
| 3,812,576 | 5/1974 | Yamaguchi | 310/237 |

FOREIGN PATENT DOCUMENTS

| | | | |
|---|---|---|---|
| 908,508 | 3/1954 | Germany | 310/20 |
| 1,111,527 | 5/1968 | United Kingdom | 310/237 |

Primary Examiner—R. Skudy
Attorney, Agent, or Firm—Fitzpatrick, Cella, Harper & Scinto

[57] ABSTRACT

An electric motor of a construction, wherein conductive wires are wound around the outer periphery of an armature core substantially in parallel with a rotor shaft and in such a manner that the terminal connection part of the winding may be provided in the axial direction of the rotor shaft, and, at the same time, a commutator is disposed inwardly at a position nearer to the core than the projected end of the terminal connection part of the winding which projects outwardly in the same direction as the axial direction of the core, whereby the length of the rotary armature in the axial direction thereof is shortened to flatten the motor per se in the axial direction thereof.

2 Claims, 9 Drawing Figures

ELECTRIC MOTOR

This is a continuation, of application Ser. No. 489,085 filed July 17, 1974, now abandoned.

BACKGROUND OF THE INVENTION

1. Field of the Invention

The present invention relates to a motor comprising a rotor having laminated cores forming an armature core surrounded with a winding and a permanent magnet field system.

2. Description of the Prior Art

The conventional motors are designed to provide two bearings mounted in such a manner that one bearing is mounted on a body case separately constructed from a rear cover and the other bearing is mounted on said rear cover. Accordingly, it has been extremely difficult to adjust a center line of an opening in the bearing on the body case to a center line of an opening in the bearing on the rear cover, thus involving the difficulty in terms of natural increase in cost required to improve the accuracy of parts. These bearings rotatably support a rotor provided with a commutator, and lubricating oil is poured onto the sliding surface between said bearings and the rotor to prevent friction. However, when lubricating oil is poured onto the supporting portion between the bearings and the rotor, the lubricating oil permeates into the commutator to often impair commutating operation of motor. In order to avoid permeation of lubricating oil into the commutator, therefore, an oil thrower has heretofore been provided outside the commutator. However, in the so-called disc commutator of the type in which a disc-like slip ring is mounted perpendicularly to the periphery of the rotating shaft of the rotor, and a cantilever-spring-like brush is disposed in contact with said slip ring, such provision of the oil thrower member involves the difficulty such that when motor is assembled, the oil thrower member will contact the brush to interrupt the assembling work. For this reason, a so-called cylindrical commutator, which is a commutator somewhat more easily assembled than that of disc commutator, of the type in which a cylindrical plate is disposed so as to cover the periphery of a rotating shaft of the rotor, has been used. However, the provision of the oil thrower also in this case involves the difficulty such that motor is not always easily assembled, and that the thickness in an axial direction of the motor will increase because of the thicknesses of the oil thrower and commutator, thus being incapable of obtaining a compact motor.

SUMMARY OF THE INVENTION

It is a primary object of the present invention to overcome the limitations with respect to prior art motors.

Another object of the present invention to provide a motor in which two bearings are integrally provided within a single housing, instead of the conventional arrangement such that one bearing is disposed on the body case while the other on the rear cover, so that if adjustment between both center lines of openings in the bearings is once made, the rotative accuracy may readily be obtained even in case of re-disassembly or re-assembly.

It is a further object of the present invention to provide a motor in which the surface of commutator is not contaminated with oil when the bearing on the commutator side is removed.

It is another object of the present invention to provide a motor which eliminates the need of providing an oil thrower member so as to easily contact the brush with the commutator and which can be readily assembled using either disc commutator or cylindrical commutator.

It is yet another object of the present invention to provide a motor which can disregard the part accuracy by the provision of a construction such that the rear cover is not provided with a bearing for supporting one end of a rotating shaft of the rotor.

It is a still another object of the present invention to provide a motor which is easy in assembly and which is manufactured at a reduction in cost.

It is a further object of the present invention to provide a motor in which axial dimension suitable for sound instruments, etc. is small.

Other objects of the invention will become more apparent in the detailed description and drawings which follow.

DESCRIPTION OF THE PREFERRED EMBODIMENTS

Several embodiments of a motor according to the present invention will now be described with reference to the accompanying drawings.

Figure 1:
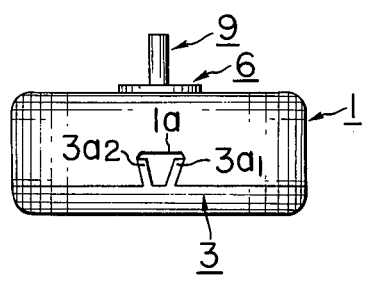
FIG. 1 is a plan view, as viewed from outside, showing an embodiment of a motor according to the present invention.
Figure 3:
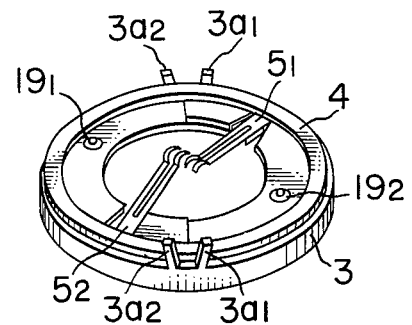
FIG. 3 is a perspective view to show the arrangement of various members connected with a rear cover 3 shown in FIG. 1.
Figure 2:
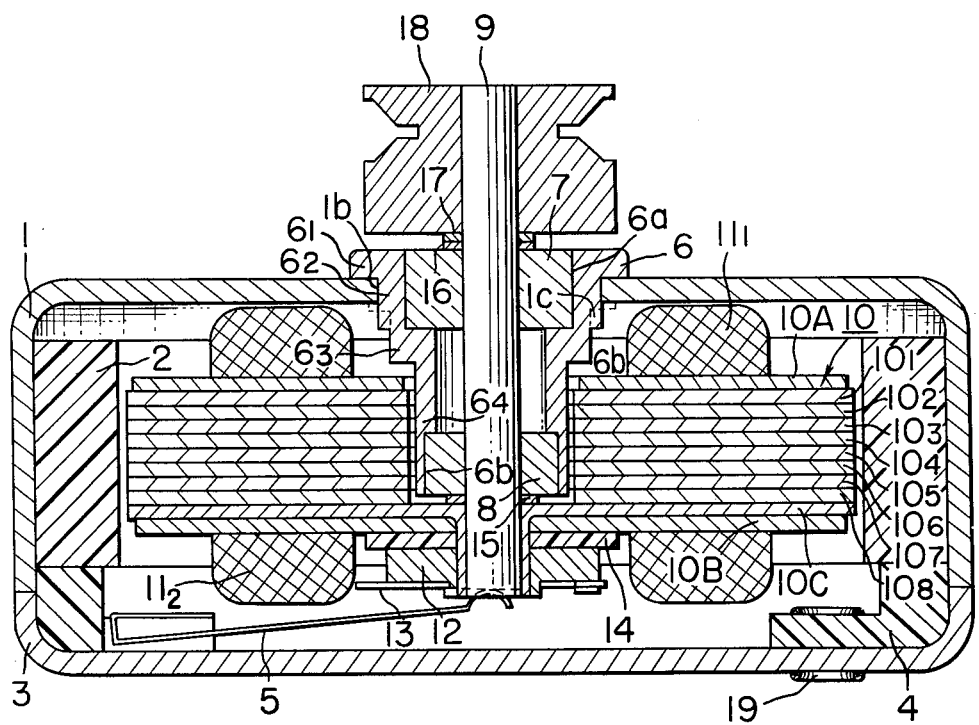
FIG. 2 is a plan view in section of the motor according to the present invention shown in FIG. 1.

FIG. 1 is a plan view as viewed from outside showing an embodiment of a motor according to the present invention, FIG. 2 is a plan view in section of the motor shown in FIG. 1, and FIG. 3 is a perspective view to show the arrangement of various members connected with a rear cover 3 shown in FIG. 1. In the figures, the motor comprises a body case 1 of motor shaped in cylindrical cup, a rear cover 3 dovetailed by fitting a male dovetail 3a into a female dovetail 1a cut in the rear portion of the body case 1, a bearing housing 6 later described, and a shaft 9 of a rotor. The body case 1 is formed with a circular side central opening portion 1b on the side opposite to the side on which rear cover 3 is connected, and a permanent magnet field system 2 is disposed on the inner peripheral surface of the body case 1 axially extending parallel with the rotor shaft 9. As may best be seen in FIG. 3, a brush holder 4 made of a non-conductive material is engaged with the rear cover 3 by stop members $19_1$ and $19_2$, and the brush holder 4 has two brushes $5_1$ and $5_2$ electrically connected to a power supply (not shown) outside the motor. Although two brushes $5_1$ and $5_2$ are shown in the drawing, a plurality of brushes may be provided in answer to a need. The bearing housing 6 formed in the hollow cylindrical shape insertable from the side central opening portion 1b into the body case 1 has its outer diameter decreased stepwise towards the inner part in the body case 1 in the forms of $6_1 > 6_2 > 6_3 > 6_4$ so that the bearing housing is fitted at the portion $6_2$ with the side central opening portion 1b of the body case 1 and is caulked at a projection portion 1c of the body case 1 so as to avoid rotation. The bearing housing further has bearing receiving portions 6a and 6b therein adapted to receive bearings 7 and 8, respectively. These bearings 7 and 8 are provided to rotatably support the rotor shaft 9. Laminated cores or plate members $10_1$, $10_2$, $10_3$, $10_4$, $10_5$, $10_6$, $10_7$, and $10_8$ are integrally held by a core support 10C made of a soft-magnetic material, and these laminated cores $10_1 - 10_8$ and core support constitute an armature core. The core support 10C is slipped and fixed on the rotor shaft 9 to form a concave portion to receive therein a part of the bearing member from a direction along the rotor shaft, and rotates integrally with the rotor shaft 9. The motor further comprises insulating members 10A and 10B disposed so as to hold the laminated cores and core support 10C therebetween, a winding 11 wound through the insulating members 10A and 10B round a slot portion of the laminated cores forming the armature core and core support 10C, an insulating portion 12 of a disc commutator mounted on the outer periphery of the rotor shaft 9 through the support core 10C, a conductor portion 13 of the disc commutator, and a spank erasing printed resistance plate 14. The laminated cores $10_1 - 10_8$ forming the armature core, the core support 10C, the insulating members 10A and 10B, the winding 11, the insulating portion 12, and the conductor portion 13 constitute a rotor 10. The winding 11 forms concave regions on both end surfaces of the core owing to raised portions thereof extending beyond both end surfaces of the core. A spacer 15 is provided to adjust an axial clearance between the bearing housing 6 and the rotor 10, and the spacer 15 has its surface machined so as to reduce a friction of the surface in contact with the rotor 10 and the bearing housing. An output pulley slipped on the rotor shaft 9 outwardly projected outside the case body 1 is arranged in spaced relation with a bearing housing 6a through two spacers 16 and 17 between the pulley 18 and the bearing housing 6a. Surfaces of the spacers 16 and 17 in such a relation as to intersect at right angles to the rotor shaft 9 are machined to reduce friction.

In the motor according to the present invention as constructed above, the brushes $5_1$ and $5_2$ held by the brush holder 4 of the rear cover 3 are normally placed in contact with the disc of the disc commutator of rotor 10, and the brushes $5_1$ and $5_2$ supplied with current from the power source located outside selectively contact with the conductor portion 13 or insulating portion 12 so that, when the brushes $5_1$ and $5_2$ come into contact with the conductor portion 13, current flows through the winding $11_1$ or $11_2$ to energize the winding $11_1$ or $11_2$. When the winding $11_1$ or $11_2$ is energized, the armature cores (10A, 10B, $10_1$–$10_8$) are magnetized to complete a magnetic circuit containing the armature core, the permanent magnet field system 2, and the body case 1 to produce torque whereby the rotor 10 may be rotated.

Figure 4:
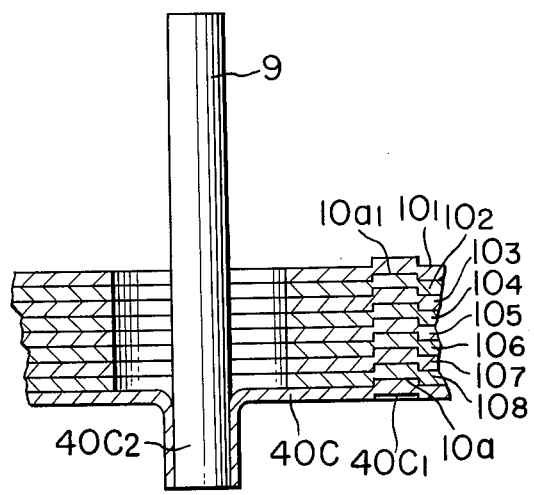
FIG. 4 is a plan view in section of a modified form of a rotor 10 in the motor according to the present invention shown in as a FIGS. 1 - 3.

FIG. 4 illustrates a second embodiment of a modified rotor 10 of the motor according to the present invention shown in FIGS. 1-3, the modified portion being enlarged and other components not shown corresponding to those shown in FIGS. 1-3. In FIG. 4, the laminated cores $10_1$–$10_8$ constituting an armature core are held by a core support 40C, and these cores support 40C are placed in position and fixedly connected at dovetails $10a_1$–$10a_8$ and $40C_1$. A shaft slip-in portion $40C_2$ drawn by conventional means is formed in the central portion of the core support 40C in order to press the rotor shaft 9 thereinto, and the rotor shaft 9 is pressed into said shaft slip-in portion 40 to integrally engage the rotor shaft 9 with the cores ($10_1$–$10_8$ and $40C_1$) forming the armature core in an extremely simple manner, thus facilitating assembly when manufactured.

Figure 5:
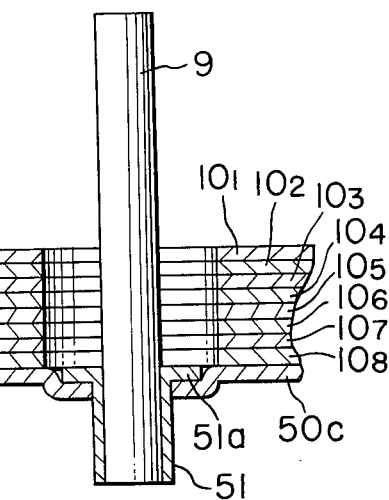
FIG. 5 is a plan view in section of a further modified form of a rotor 10 in the motor according to the present invention shown in FIGS. 1 - 3.

FIG. 5 illustrates a third embodiment of a modified rotor 10 of the motor according to the present invention shown in FIGS. 1-3, the modified portion being enlarged and other components not shown corresponding to those shown in FIGS. 1-3. In FIG. 5, a core support 50C holding laminated cores $10_1$–$10_8$ forming an armature core is disposed in overlapping relation with a flange portion 51a of a shaft slip-in member 51 slipped on the rotor shaft 9, and the flange portion 51a and the core support 50C are welded by a spot welding or the like and thereafter the rotor shaft 9 is slipped in the shaft slip-in member 51 to integrally engage the rotor shaft 9 with the armature cores ($10_1$–$10_8$, 50C) forming the armature core in an extremely simple manner, thus facilitating assembly when manufactured.

Figure 6:
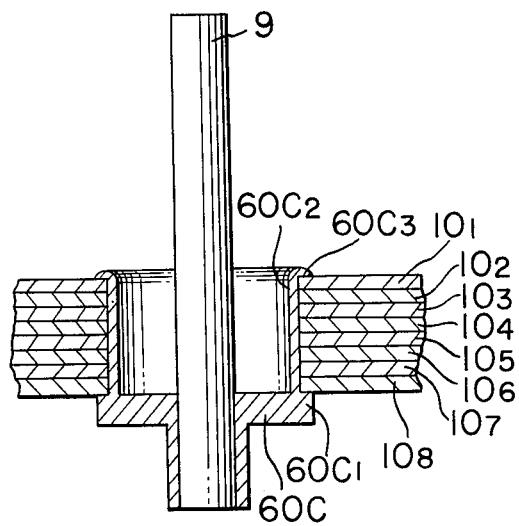
FIG. 6 is a plan view in section of a still another modified form of a rotor 10 in the motor according to the present invention shown in FIGS. 1 - 3.

FIG. 6 illustrates a fourth embodiment of a modified rotor 10 of the motor according to the present invention shown in FIGS. 1-3, the modified portion being enlarged and other components not shown corresponding to those shown in FIGS. 1-3. In FIG. 6, a core support 60C holding laminated cores $10_1$–$10_8$ forming an armature core is partly slipped on the rotor shaft 9, and this core support 60C comprises a flange portion $60C_1$ adapted to stop the end of the armature core and a cylindrical portion $60C_2$ extended parallel with the rotor shaft 9 from the flange portion $60C_1$ and adapted to be slipped into the central opening portion of the laminated core. Accordingly, when the central opening portion of the armature core is fitted in a cylindrical portion $60C_2$ of the core support 60C slipped on the rotor shaft 9 and thereafter the cylindrical portion $60C_2$ is caulked by conventional caulking means, the core support 60C may be formed in integral with the laminated core in an extremely simple manner by the aid of a caulked portion $60C_3$ of the cylindrical portion $60C_2$ and the flange portion $60C_1$. That is, the rotor shaft 9 is placed in integral with the armature cores ($10_1$–$10_8$, 60C), thus facilitating assembly when manufactured.

Figure 7:
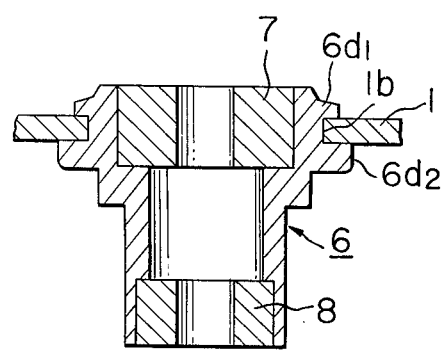
FIG. 7 is a plan view in section of another modified form of combination means of a body cover 1 and a bearing housing 6 in the motor according to the present invention shown in FIGS. 1 - 3.

FIG. 7 illustrates a fifth embodiment of modified combination means of the body cover 1 and the bearing housing 6 in the motor according to the present invention shown in FIGS. 1-3, the modified portion being enlarged and other components not shown corresponding to those shown in FIGS. 1-3. In FIG. 7, the cylindrical bearing housing 6 is provided with flanges $6d_1$ and $6d_2$ on the side where bearing 7 is held. The flange $6d_1$ has its outer diameter formed smaller than that of the flange $6d_2$, and the side end formed between the flange $6d_1$ and a portion where bearing 7 in the housing 6 is held is tapered so as to gradually increase the diameter thereof towards the flange $6d_1$. In the bearing housing 6 formed in the shape as described above, when the end on the side where bearing 7 in the bearing housing is held is placed in contact with the side central opening portion 1b of the body case 1 and thereafter the side central opening portion 1b is pressed in the direction as indicated by the arrow in the drawing while the body case is gradually spun, members in the vicinity of the side central opening portion 1b will receive elastic deformation along the tapered portion of the bearing housing and will soon slip into a slit portion between the flanges $6d_1$ and $6d_2$ resulting in a spinning process being applied thereto, thus providing an extreme readiness in manufacture.

Figure 8:
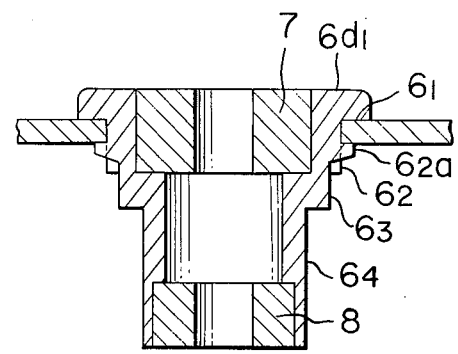
FIG. 8 is a detailed plan view in section showing combination means of a body cover 1 and a bearing housing 6 in the motor according to the present invention shown in FIG. 2.

FIG. 8 illustrates a more detailed form of combination means of the body cover 1 and the bearing housing 6 in the motor according to the present invention shown in FIG. 2. In FIG. 8, the cylindrical bearing housing 6 is provided with a flange $6d_1$ on the side where bearing 7 is held and has its outer diameter formed to be decreased stepwise as it parts away from the flange $6d_1$, and a stepped portion $6_2$ has its outer diameter substantially equal to the diameter of the side opening central portion 1b in the body case 1. In the bearing housing 6 formed in the shape as described above, after the stepped portion $6_2$ has been brought in engagement with the side opening central portion 1b in the body case 1, the body cae 1 is caulked by conventional caulking means between the flanges $6d_1$ and stepped portion $6_2$ so as to form a stepped portion $6_{2a}$ as shown, thus providing an extreme readiness in manufacture.

Figure 9:
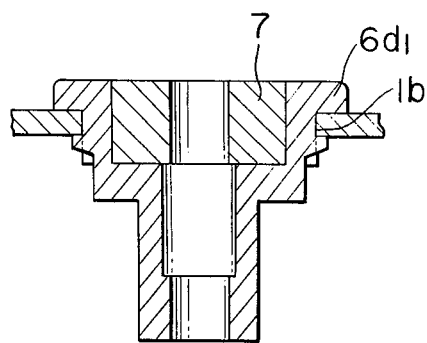
FIG. 9 is a plan view in section of a further modified form of combination means of a body cover 1 and a bearing housing 6, and a bearing housing 6 in the motor according to the present invention shown in FIGS. 1 - 3.

FIG. 9 illustrates a seventh embodiment of a modified form of combination means of the body cover 1 and the bearing housing 6, and the bearing housing 6 in the motor according to the present invention shown in FIGS. 1-3, the modified portion being enlarged in the drawing and other components not shown corresponding to those shown in FIGS. 1-3. In FIG. 9, the cylindrical bearing housing 6 is provided with a flange $6d_1$ on the side where bearing 7 is held and has its outer diameter formed to be decreased stepwise as it parts away from its flange $6d_1$, and a stepped portion $6_2$ has its outer diameter substantially equal to the diameter of the side opening central portion 1b in the body case 1. The bearing housing 6 is made of a material suitable for bearings and also serves as a bearing 8 as shown in FIG. 2, which has been removed herein. In the FIG. 9 arrangement, the bearing 7 is formed independently of the bearing housing 6, but it may of course be designed so that the bearing 7 serves as the bearing housing 6. Further, the bearing housing 6 is made of a material suitable for bearings, as described above, and the bearings 7 and 8 as shown in FIG. 2 are removed, whereby the diameter of a portion in which the bearing housing 6 is slipped in the depression of the rotor may be reduced and the depression of the rotor may also be made smaller accordingly, thus providing the motor with the better magnetic characteristics. As discussed in the sixth embodiment shown in FIG. 8, also in the bearing housing 6 disclosed in the embodiment shown in FIG. 9, after the stepped portion $6_2$ has been brought in engagement with the side opening central portion 1b in the body case 1, the body case 1 is caulked by conventional means between the flanges $6d_1$ and stepped portion $6_2$ so as to form a stepped portion $6_{2a}$ as shown, thus providing an extreme readiness in manufacture.

From the above, it will be appreciated that the present invention provides a motor in which depression is provided in a central portion of the motor-rotor having an armature core surrounded with windings, said depression is overlapped to cover a bearing housing portion, and the bearing housing having two bearing mounted thereon is fixed on the side of a body case where a permanent magnet field system is supported, without providing with bearings on the side of a rear cover where a brush holder is supported. As a result, the dimension in the axial direction of the motor may be shortened, and the integral construction of two bearings into one housing enables to easily obtain the rotative accuracy, as far as lines of bearing openings are once adjusted, even in case of re-disassembly or re-assembly. Furthermore, since the rear cover is not provided with a bearing to support one end of the shaft, the motor may be obtained with a reduced cost and with a minimum requirement of part accuracy with respect to the rear cover. Moreover, since an oil thrower is not mounted externally of the commutator, the brushes may easily be placed in contact with the commutator whereby assembling may readily be accomplished irrespective of the type of commutator used, either discommutator or cylindrical commutator. In addition, the axial dimension is so small that the motor may suitably be applied to sound instruments, etc., thus providing excellent practical advantages.

I claim:
1. An electric motor, comprising:
   (a) a casing;
   (b) magnet means mounted around the inner periphery of said casing;
   (c) an integral bearing member formed of suitable bearing material, said bearing member being secured on a first side wall of said casing to extend from said wall into said casing in the axial direction thereof;
   (d) a rotor positioned for rotation within the field of said magnet means, said rotor including:
      (1) a rotor shaft rotatably mounted in said bearing member;
      (2) an armature core formed by laminating a plurality of laminated plate members on a core support, said core support being disposed at one end of said armature core and secured to said rotor shaft, and said plate members each having a through-hole at the center thereof, and said plate members, through sequential lamination onto said core support, being secured to said rotor shaft and forming a concave portion to receive therein a part of said bearing member from a direction along said rotor shaft;
      (3) a winding wound around said armature core to pass through both end surfaces of said armature core, said windings forming concave regions on both end surfaces of said armature core owing to raised portions thereof extending beyond both end surfaces of said armature core; and
      (4) a disc-shaped commutator secured on said shaft, said commutator being disposed within one concave region formed at one end surface of said core where said concave portion is not formed; and

(e) brush means resiliently contacting a part of said commutator, said brush means being fixed on a second side wall of said casing.

2. An electric motor comprising:
(a) a stator having:
  (1) a main body casing in a cylindrical form, one end of which is open and the other end of which is closed;
  (2) a cover to close the opening in said main body casing;
  (3) magnets provided around the inner periphery of said main body casing;
  (4) an integral bearing member formed of suitable bearing material, said bearing member being secured to the wall of said main body casing opposite said cover to extend from said wall into said casing along the axial direction of said casing;
(b) a rotor disposed within said main body casing for rotation in the field of said magnets, said rotor having:
  (1) a rotor shaft rotatably mounted in said bearing member;
  (2) an armature core formed by a plurality of laminate plate members on a core support, said core support being disposed at one end of said armature core and secured to said rotor shaft, and said plate members each having a through-hole at the center thereof, and said plate members, through lamination onto said core support, being secured to said rotor shaft and forming a concave portion to receive therein a part of said bearing member from a direction along said rotor shaft; and
  (3) a winding wound around said armature core to pass through both end surfaces of said armature core, said winding forming concave regions on both end surfaces of said armature core owing to raised portions thereof extending beyond both end surfaces of said armature core; and
  (4) a disc-shaped commutator secured on said shaft, said commutator being disposed within one concave region formed at the end surface of said core where said concave portion is not formed; and
(c) brush means resiliently contacting a part of said commutator, said brush means being secured to the inner wall of said cover.

* * * * *

UNITED STATES PATENT AND TRADEMARK OFFICE
CERTIFICATE OF CORRECTION

PATENT NO. : 4,088,914

DATED : May 9, 1978

INVENTOR(S) : KANEMASA AOKI

It is certified that error appears in the above-identified patent and that said Letters Patent are hereby corrected as shown below:

Col. 1, line 43, after "than" delete "that of" and insert --a--;

line 47, after "such that" insert --the--;

line 60, after "other" insert --is--.

Col. 2, line 33, after "shown in" delete "as a";

line 50, after "housing 6" (first occurrence) delete ", and a bearing housing 6";

line 65, after "motor shaped" delete "in".

Col. 3, line 43, change "spank" to --spark--.

Col. 4, line 37, delete "armature".

Col. 5, line 40, after "housing 6" (first occurrence) delete ", and the bearing housing 6".

Col. 6, line 10, change "bearing" (second occurrence) to --bearings--;

UNITED STATES PATENT AND TRADEMARK OFFICE
CERTIFICATE OF CORRECTION

PATENT NO. : 4,088,914

DATED : May 9, 1978

INVENTOR(S) : KANEMASA AOKI

It is certified that error appears in the above-identified patent and that said Letters Patent are hereby corrected as shown below:

Col. 6, line 28, delete "discommutator" and insert --disc commutator--;

line 47, after "formed by" delete "laminating".

Col. 8, lines 1-2, change "laminate" to --laminated--.

Signed and Sealed this

Ninth Day of October 1979

[SEAL]

Attest:

RUTH C. MASON
Attesting Officer

LUTRELLE F. PARKER
Acting Commissioner of Patents and Trademarks